United States Patent
Cahill

(10) Patent No.: US 11,412,299 B2
(45) Date of Patent: Aug. 9, 2022

(54) OPTIMIZATION OF CONTENT REPRESENTATION IN A USER INTERFACE

(71) Applicant: Comcast Cable Communications, LLC, Philadelphia, PA (US)

(72) Inventor: James Cahill, Feasterville, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 248 days.

(21) Appl. No.: 15/681,980

(22) Filed: Aug. 21, 2017

(65) Prior Publication Data

US 2019/0058919 A1    Feb. 21, 2019

(51) Int. Cl.
*H04N 21/442* (2011.01)
*H04N 21/258* (2011.01)
*G06F 16/40* (2019.01)
*G06F 16/70* (2019.01)
*G06F 16/535* (2019.01)
*H04N 21/25* (2011.01)

(52) U.S. Cl.
CPC ....... *H04N 21/44226* (2020.08); *G06F 16/40* (2019.01); *G06F 16/535* (2019.01); *G06F 16/70* (2019.01); *H04N 21/252* (2013.01); *H04N 21/25866* (2013.01)

(58) Field of Classification Search
CPC ........ H04N 21/44222; H04N 21/25866; G06F 17/30781; G06F 17/30017
See application file for complete search history.

(56) References Cited

U.S. PATENT DOCUMENTS

2015/0131967 A1* 5/2015 Batiz .................... G06K 9/6254
386/241

* cited by examiner

*Primary Examiner* — Yassin Alata
(74) *Attorney, Agent, or Firm* — BakerHostetler

(57) ABSTRACT

Methods and systems are described for providing optimal representations of content. A user interface may present content based on one or more images representing the content. User interactions associated with the content may be tracked based on which of the one or more images was used to represent the content. Statistical information may be tracked to determine which groups of users respond to particular images used to represent content. The statistical information may be used to select which images are used to represent the content for additional users.

28 Claims, 10 Drawing Sheets

OPTIMIZATION OF CONTENT REPRESENTATION IN A USER INTERFACE

BACKGROUND

Content systems, such as those associated with streaming content systems, DVRs, fiber and cable systems and the like, typically use graphical user interfaces to allow users to navigate, review and select content. Often, content creators such as a movie or television (TV) studio will supply multiple images to represent particular content, such as a movie or TV show. These images can have different sizes and include different cast members and the like. The media presentation provider will then select an image to represent the content, typically based on background or size. However, improvements in the selection and display of images via graphical user interfaces are needed.

SUMMARY

In a user interface, content, such as a movie or television show, may be represented by one or more images along with text describing the content. Some users may respond differently based on which of the one or more images are used to represent the content. The present disclosure relates to methods and systems for determining an optimal image (e.g., or preferred image) to represent content to engage user interest. The optimal image may be determined based on user information, such as statistical information, demographics, viewing history, and other information.

The present methods and systems can be used to determine the optimal image to represent content for a particular member of a characteristic group, such as a demographic group. A variety of images may be provided to different members of a characteristic group (e.g., a statistical group). Navigation data related to the selection of content and associated images may be collected for members of the characteristic group to determine which images are more likely to engage interest in content for members of the characteristic group. The navigation data can then be used to determine optimal or preferred images for other members of the characteristic group.

The navigation data may be collected in response to user interactions with a user interface, such as selecting an image tile representing the content in a menu, or requesting to access the content. Indications of the user interactions associated with the image in the user interface and associated user information can be stored. The stored indications can be used to determine an optimal image to represent content for other members of the characteristic group. The optimal image may then be supplied to other members of this characteristic group. Such a determination of an optimal image using these operations can be done for multiple characteristic groups.

Providing an optimal image to members of a characteristic group can result in increased consumer usage of a content system since users will find more content that looks interesting. Such increased consumer usage can result in improved customer loyalty and retention.

Additional advantages will be set forth in part in the description which follows or may be learned by practice. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION OF ILLUSTRATIVE EMBODIMENTS

Providing images that specifically appeal to the members of a group (e.g., demographic group), rather than users as a whole, allows for different demographic groups to be given different preferred images. This approach provides for a more personalized and appealing content user interface to the members of the different characteristic groups, such as demographic groups.

For example, if a specific piece of content has multiple associated images, the system may determine that midwestern men select the content more often when image A is used; while west coast women select the content more often when image B is used. This information can be used to customize a user interface such that, thereafter, midwestern men see image A and west coast women see image B associated with the content. Thus, both groups will see an associated image that they would prefer.

Statistical data of users of a user interface may be used to determine which images to supply to the user. The users may be associated with characteristic groups. The characteristic groups may represent income distinctions, age distinctions, and location information. The statistical information can be obtained from user information provided to a content provider.

The content system can be network or cloud system, by which a content provider, such as a cable television service provider, receives requests through a user interface and provides content for playback. Other systems, such as a content system, may implement aspects of the present disclosure. Content may comprise a content asset or program. For example, the content may comprise a television show, a movie, a sports event broadcast, or the like. As used herein, content may additionally include a portion of a program or content asset.

Figure 1A:
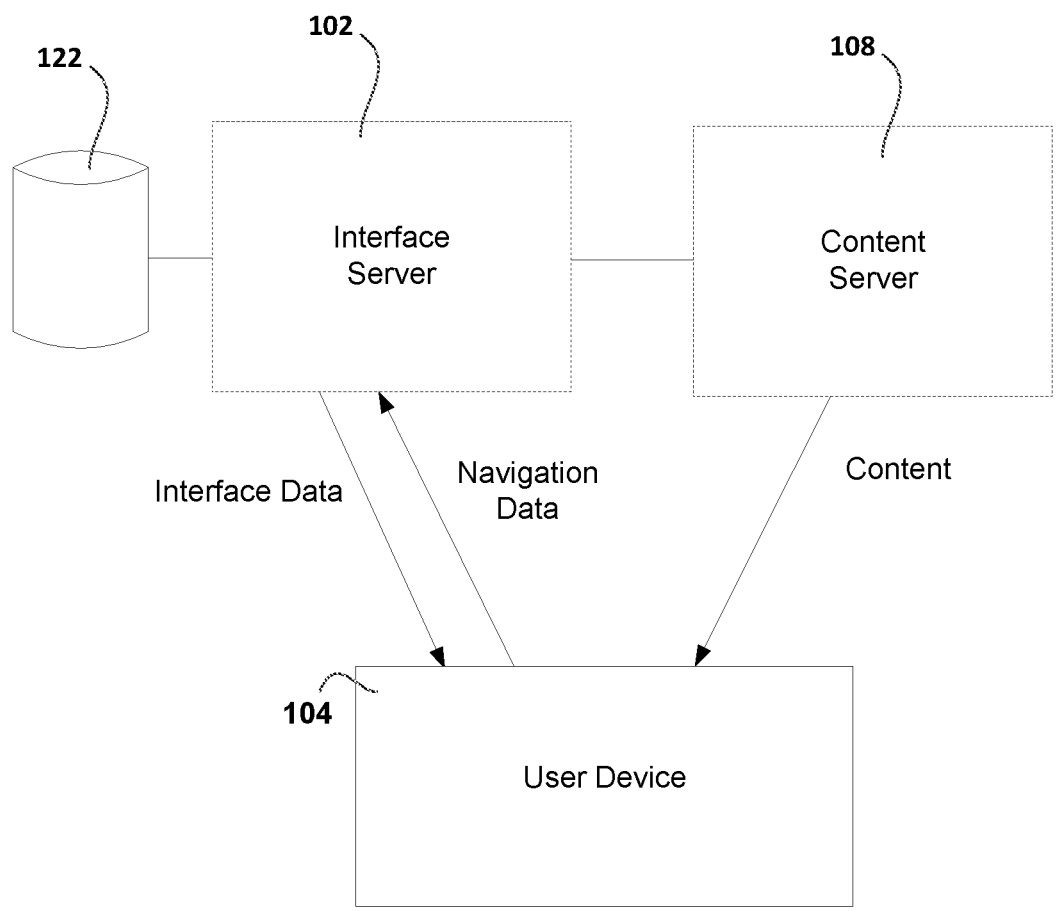
FIG. 1A is a block diagram illustrating an example system.

FIG. 1A shows an interface server 102 or computing device that provides images and other data that allows a user device 104 to construct a user interface, such as a graphical user interface. For example, the interface server 102 may provide images and other data that allows the user device 104 to populate user interface templates to produce interface pages that allow the user to select content. The interface server 102 may be associated with a content server 108 that provides content, e.g., video, audio, programs, shows, applications. The interface server 102 may generate a portion or all of the user interface, which may be transmitted to the user device 104. The user interface may be part of a content selection system that allows the user to select content to access using menus and the like. The user interface may sort content by genre and/or network. The user interface may comprise a content recommendation system which is an information filtering system that seeks to predict content of interest to the user.

The user interface may comprise interface elements associated with content, such as movies, audio, programs, shows, newscasts, sportscasts, social media, and/or the like. The interface elements may comprise buttons, links, windows, boxes, menus, lists and/or the like. The interface elements may comprise an image element (e.g. window, box) that displays an image. The image may be associated with content. The image element may be presented with the content on a page (e.g., dedicated to a specific content asset), in a menu item (e.g., as part of a menu).

A user interaction (e.g., click, selection) can be used to instruct the content server 108 to provide interface data to the user device. A user interaction may cause the user interface to navigate to a page with details about the selected content.

The user interactions may be transmitted to and/or received by a computing device such as the interface server 102. Alternately, user interactions may be transmitted to, processed by, or stored at another server or computing device. The servers can include functionality implemented at one or more server devices for client devices. The servers, such as interface server 102 and content server 108, can comprise one or more computing devices that can implement the methods described herein.

The user device 104 may output content to the user. The user device 104 may receive a user interaction indicating a request for content from the user. The user device 104 may transmit a request for the content to the content server 108. The content server 108 may transmit the content to the user device 104. The content may be transmitted as a content stream, a content file, and/or the like. The user device 104 may comprise a display and/or be in communication with a display. The content may be rendered, presented, and/or the like to the user via the display.

The user device 104 may comprise a display device, a television, a set top box, a streaming media device, a smart device (e.g., smart wearable, smart glasses), mobile phones, onboard device (e.g., vehicle entertainment system), a tablet, a laptop, a computing station, and/or the like. The user device 104 may be configured to output (e.g., display, render, present) the user interface to users. The user device 104 may be configured to receive a user interaction with the user interface. The user interaction may comprise selection of an interface element (e.g., a button, a link, a window). The user interaction may comprise a selection of content from a menu (e.g., or a list) of content assets. The user interaction may comprise a navigation command, such as navigating away from content (e.g., a back button, scrolling in a direction (e.g., up, down, left, right) away from content. The user interaction may comprise hovering over content. The user interaction may comprise delaying to navigate. For example, a user may stop providing user interactions while viewing at a menu item representing particular content. The user device 104 may store one or more of the user interactions as navigation data. The navigation data may comprise a context of the user interaction. The context may comprise a sequence of user interactions before and/or after the user interaction. The context may comprise a menu, a submenu, a page, and/or the like in which an associated user interaction is received. For example, the context may indicate that a user selected an image element from a menu to access a content page associated (e.g., dedicated to) the content asset. The specific menu and/or menu type may be indicated in the context. For example, the menu may comprise a grouping of content, such as by category, viewing pattern (e.g., suggestion based on previously viewed content), popularity, and/or the like. The navigation data may comprise a content identifier associated with the content. For example, the navigation data may comprise a content identifier for content that a user requested to access, a content identifier for content that a user did not request to access (e.g., the user passed over or otherwise viewed an image tile representing the content, perhaps while navigating a menu).

The user device 104 may transmit the navigation data (e.g., indicating selections) to the interface server 102. The user device 104 may transmit the navigation data. The navigation data may be transmitted in response to an event, such as a user interaction (e.g., user selects a content item from a menu, user selects a button to request rendering of the content). The navigation data may be transmitted based on a predetermined schedule, a request from the interface server 102, and/or the like. The user device 104 may transmit user information (e.g., with the navigation data) to the interface device 102. The user information may comprise demographics, such as age, nationality, gender, location, and/or the like. The user information may comprise account information, such as subscription tier, purchase history, user settings, scheduled content recordings, social media information, and/or the like.

The interface server 102 may be configured to receive (e.g., together or separately) the navigation data and/or the user information (e.g., user information associated with the navigation data) from the user device 104. The interface server 102 may be configured to store navigation data and/or user information in a data store 122, such as a database, a file, and/or the like. Other storage devices may be used, such as volatile memory (e.g., random access memory (RAM)), a hard disk drive, a network-attached storage (NAS), and/or a storage area network (SAN) upon which the content or portions thereof may be stored.

The interface service 102 may be configured to generate predictive data (e.g., or associative data) based on the navigation data, user information, and/or the like. For example, the interface server 102 may be configured to store an association between one or more of an identifier of content (e.g., selected or not selected by the user), an identifier of an image used to represent the content, a user identifier, a user interaction (e.g., selected content from a menu, accessed content, navigated back to the menu from the content, did not access content), a navigation context (e.g., menu, submenu, page), user information (e.g., demographic identifier, group identifier).

The predictive data may comprise statistical information based on the navigational data, user information, and/or the like. The predictive data may comprise statistical information based on user interactions, the context associated with the user interaction, the content associated with the user interaction, the image used to represent the content, user information, a combination thereof, and/or the like. The statistical information may comprise counts (e.g., or other user interest metric) associated with characteristic groups (e.g., statistical groups). For example, the navigational data and user information received for a specific user interaction may be analyzed to determine a characteristic group. For example, demographic information associated with the user performing the user interaction may be used to match (e.g., associate) a particular user interaction with a characteristic group. The predictive data may comprise a plurality of characteristic groups. The characteristic groups may be predefined or may be learned, via machine learning or other statistical analysis. The specific user interaction may be matched to one or more characteristic groups. Each of the one or more characteristic groups may be associated with a count indicative of a number of user interactions associated with the particular characteristic group. The count may be incremented for each of the one or more characteristic groups that match a particular user interaction.

The interface server 102 may be configured to determine an optimal image for a user or user group based on the predictive data (e.g., navigation data, user information, associations, groupings, statistical information). Alternately or additionally, another device may receive, process, and/or store the information stored in the data store 122. The optimal image may comprise an image associated with a highest likelihood (e.g., highest probability, highest count) of engaging (e.g., or causing) interest of a user to interact (e.g., request, access) with particular content. The likelihood may be specific to a particular characteristic group that matches the user. The optimal image may be determined based on determining an image that has a highest count (e.g., of positive user interactions) for a particular characteristic group to which the user belongs. Thus, the optimal image may vary based on the user.

The statistical information may be tracked for a plurality of images associated with the content. For example, each content asset may have a corresponding plurality of images for representing the content in the user interface. Different characteristic groups may be used to track user interactions for different content. For example, for sports content, characteristic groups may be based on user locations. For news content, characteristic groups may be determined based on user interests. If a user requests interface data (e.g., content related data for a menu or content page), the interface server 102 may determine the optimal image for a particular user to represent content based on statistical information at the time of the request for interface data. The optimal image for a particular user may change over time as the statistical information is updated, as the user is grouped differently, and/or the like. If a user belongs to multiple characteristic groups, the optimal image may be determined based on a combination of counts associated with the multiple groups. The combination may comprise additional of the counts, a weighted average of the counts, a non-weighted average of the counts, and/or the like. The counts tracked in the statistical information may be positive or negative. For example, a negative user interaction, such as a user navigating past or otherwise ignoring an image representing content, may be associated with a negative count. A positive user interaction, such as a user requesting clicking on an image element representing content or requesting to access the content, may be associated with a negative count.

The data store 122 may comprise a first table (such as Table 1 discussed below) that indicates user interactions (e.g., content selections) for a specific image associated with the content for each characteristic group. As additional navigation data is received, by the interface server 102, the interface service 102 may generate and/or update the first table. For example, for each image used to represent particular content, a count of the number of user interactions may be updated for one or more characteristic groups.

The data store 122 may also comprise a second table that associates user identifiers with characteristic groups, such as demographic groups. User information sent by the user device 104, or other information, such as registration information (e.g., data from another source) can be used to determine the characteristic group for a user (e.g., or user device 104). If navigation data is received for a particular user (e.g., or user device 104), the user identifier for the user can be used to look up an associated characteristic group in the second table. Then, a count or other metric in the first table may be updated for an associated characteristic group.

Figure 1B:
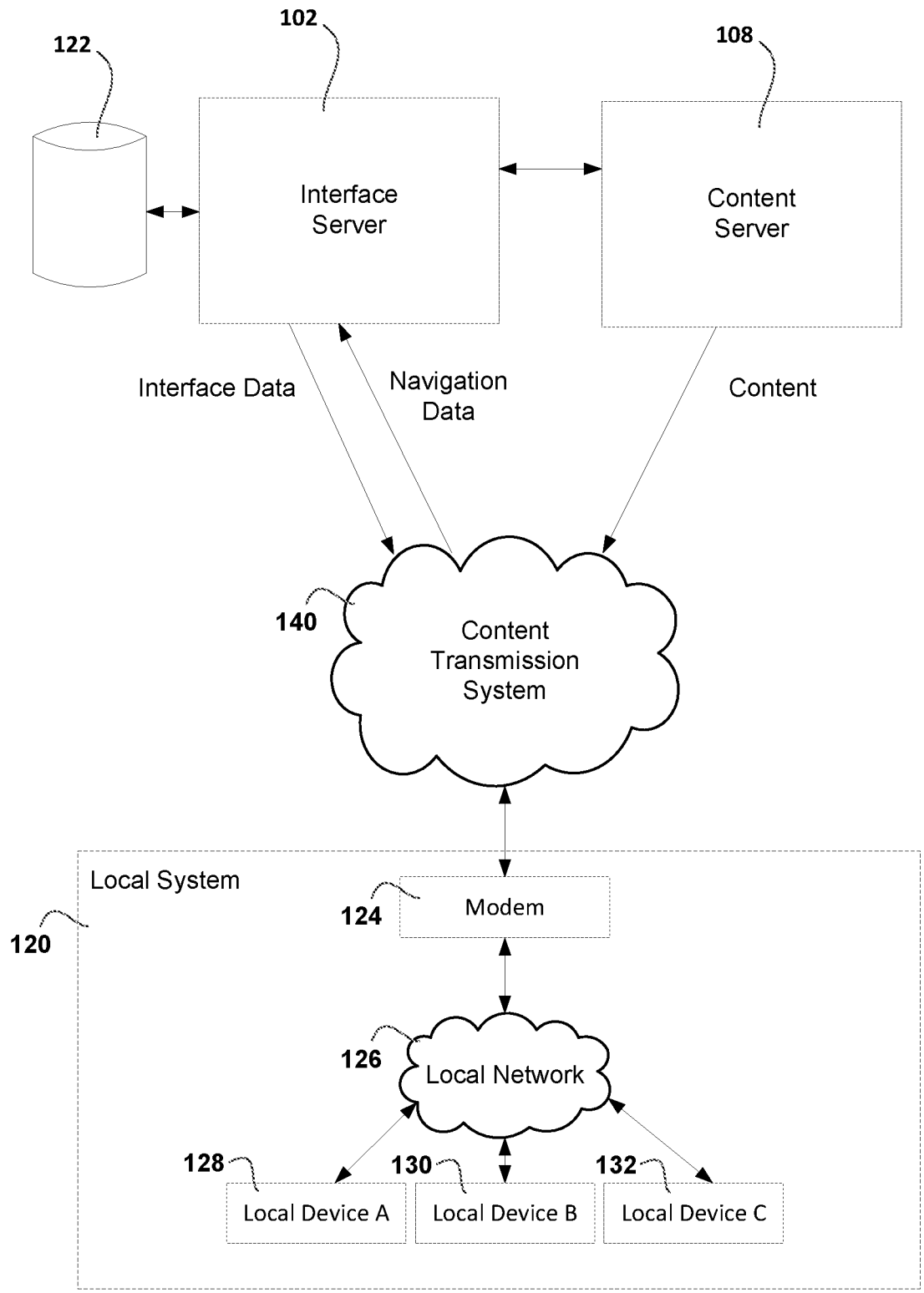
FIG. 1B is a block diagram illustrating another example system.

FIG. 1B shows details of an exemplary local system 120. The local system 120 can be connected to the interface server 102 and content server 108 through a content delivery system 140, such as a cable system, satellite system, Internet Protocol (IP) delivery system, phone or cellular system.

The local system 120 can include a modem 124 connected to a local network 126. The modem 124 can interact with the specific type of content delivery system 140. For example, the modem 124 can be a cable modem, a satellite modem, or the like. Alternately, the local devices need not use a modem to connect to the interface server 102 and content server 108.

Local devices, such as local devices 128, 130 and 132, can connect through the local network 126 to receive video presentations and user interface data. The local network 126 can be a wireless network or a wired network. The local devices, such as local devices 128, 130 and 132, can construct the user interfaces using the user interface data including images. The local devices 128, 130, and 132 may comprise the user device 104 of FIG. 1A. For example, the local devices 128, 130, and 132 may be configured to perform any of the functionality described for the user device 104 of FIG. 1A.

The local system 120 need not include a modem 120 or a local network 126. For example, the local system 120 can be a local device such as a computer or a mobile phone that connects to a cellular or Wi-Fi network.

It will be appreciated that the device used to request that the content be provided in the system may be distinct from the device used to receive the content for playback. To illustrate, a user may use his or her local device (e.g., set-top cable box or other computing device) to request that a particular content be provided in the system, but may later request and playback the content with software running on his or her smart phone. The device may be connected to the system via any suitable network, which may comprise, for example, a cable network, satellite network, and/or the Internet.

In one example, the interface server 102 can provide user interface data including images to multiple local systems through the content transmission system 142 to local systems. Multiple members of a demographic group can receive user interface pages, some receiving image A (for example, a close-up of an actor) and some receiving image B (for example, a group photo).

The selections of the content associated with the images can be sent through the content transmission system to the interface server 102 to ultimately be stored at database 122.

Figure 2A:
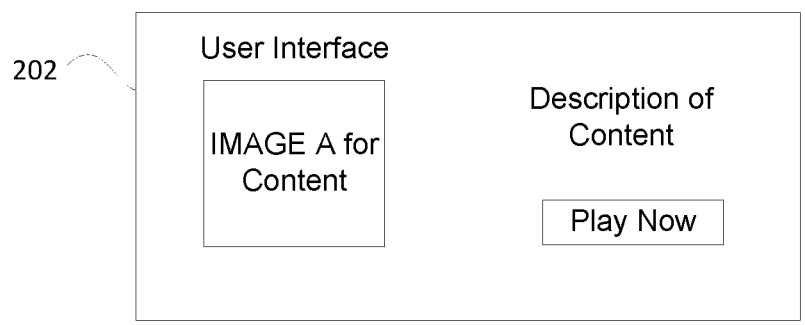
FIG. 2A shows an example user interface with an image.
Figure 2B:
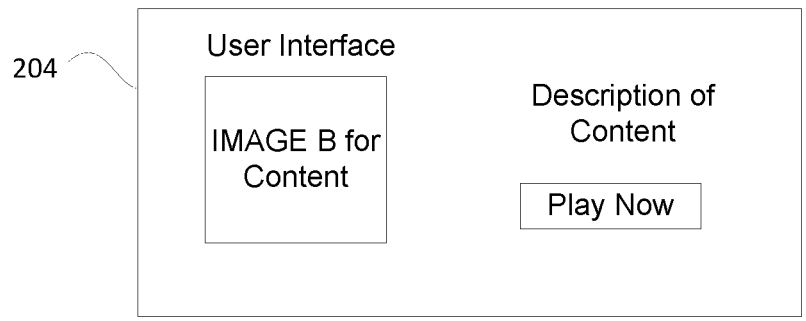
FIG. 2B shows an example wither with an alternate image.

FIG. 2A and FIG. 2B show examples of user interfaces with alternate images representing the same content. FIG. 2A shows a user interface 202 with image A. FIG. 2B shows a user interface 204 with image B. As described herein, the images, such as image A of user interface 202 or image B of user interface 204, can be one of multiple images that can be associated with particular content, such as a movie, a show, a program, a newscast, a sportscast, a media clip, and/or the like. If a user interacts with (e.g., selects, requests) content from a user interface, an indication of the associated image, such as image A of user interface 202 or image B of user interface 204, can be transmitted to the interface server 102. The example of FIG. 2A and FIG. 2B shows two different images but more than two images could be used to represent the content.

In one example, a situational comedy may be represented with multiple images, such as an image emphasizing the parents (e.g., image A) and an image emphasizing the children (e.g., image B). Members of different demographic groups may be more attracted to different aspects of a show. For example, teenagers may be more attracted by image A emphasizing the children in the situation comedy while adults may be more attracted by image B emphasizing the parents in the situation comedy. As described below in FIG. 3A, FIG. 3B, and FIG. 4, the selection of images to play a program (or to learn more about a program) of members of a demographic group can be used to determine the images to provide to other members of the demographic group.

Figure 3A:
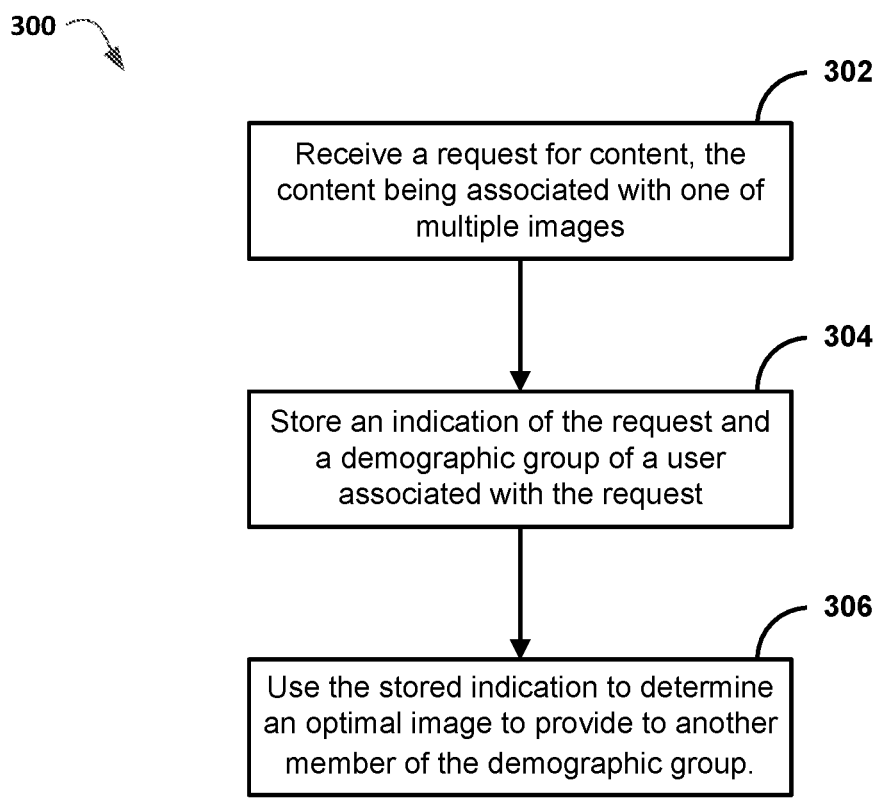
FIG. 3A is a flow diagram illustrating an example method.

In reference to FIG. 3A, at step 302, a request for content (e.g., a video presentation) is received. The content may be associated with one of multiple images, such as image A from user interface 202. The request may comprise an indication of which image was provided to the user. Alternately, the image ID may be stored at the server associated with a user ID and the image ID may be derived from the user ID.

In step 304, an indication of the request associated with the one of multiple images and a demographic group of a requester may be stored. The indication may be stored, permanently or temporarily, in memory or a database. The indication may be an updated counter value or a temporary indication that is used to determine an updated counter value or some other indication.

Steps 302 and 304 may be performed in a test period. For example, during a test period, image A may be randomly provided to half of the members of a demographic group that requests a user interface page associated with content. Image B can be provided to the other half of the members of a demographic group that requests a user interface page associated with the content. During the test period, the system may determine whether image A (a close-up of an actor) or image B (for example, a group photo) receives more positive user interactions (e.g., selections). For example, among members of a demographic group, image A could have a 29% click-through rate and image B could have a 40% click-through rate, and it can be determined that image B is to be preferred for that demographic group. After the test period, the tabulated selections may be used to provide a preferred image to other users in the demographic group in step 306.

The testing can be concurrent with providing preferred images to other users as described below. For example, certain users may receive random images for testing while other users receive the preferred images for the demographic group associated with the users.

In step 306, the stored indication may be used to determine an image (e.g., associated with the content) to provide to another member of the demographic group. For example, an updated count associated with one of multiple images can be used to calculate whether to provide that image or another image of the multiple images.

Figure 3B:
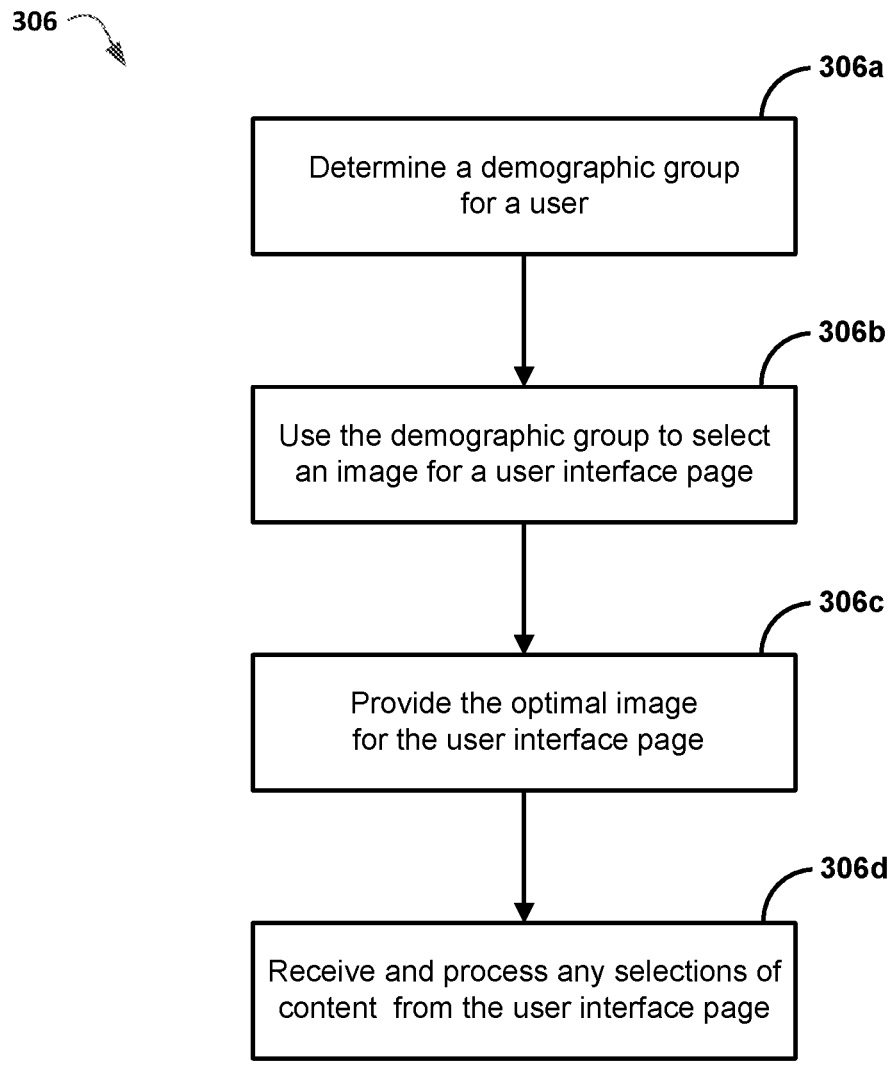
FIG. 3B is a flow diagram illustrating another example method.

FIG. 3B shows an example implementation of step 306. In step 306a, a demographic group may be determined for a user. For example, the demographic information may be derived from subscriber information. A user ID in the request for an updated user interface or user interface page can be used to do a look-up of the user's demographic category.

In step 306b, the demographic information may be used to select a preferred image for a user interface page. For example, five hundred (500) members of a demographic group may be provided user interface 202 with image A. Thirty seven (37) members of the demographic group may watch the associated movie. Five hundred (500) members of the demographic group may be provided user interface 204 with image B. Fifty-six (56) members of the demographic group may watch the associated movie. In this scenario, it may be determined that image B in user interface 204 is more persuasive/desirable to members of the demographic group.

The result may be different for different demographic groups. For example, 500 members of another demographic group may be provided user interface 202 with image A. Forty two (42) members of the additional demographic group may watch the associated movie. 500 members of the additional demographic group may be provided user interface 204 with image B. Thirty five (35) members of the additional demographic group may watch the associated movie. In this scenario, it may be determined that the image A in user interface 202 is more attractive to members of the second demographic group.

In step 306c, the preferred image may be provided so that the user interface page can be generated for the user. The preferred image may be part of user interface information or a user interface (or user interface page) that is provided to the user.

In step 306d, any selections of content from the user interface page may then be received and processed. For example, any selections of content can cause a download of this content. Further, the selections can also be used to update the preferred image data as discussed above.

Figure 4:
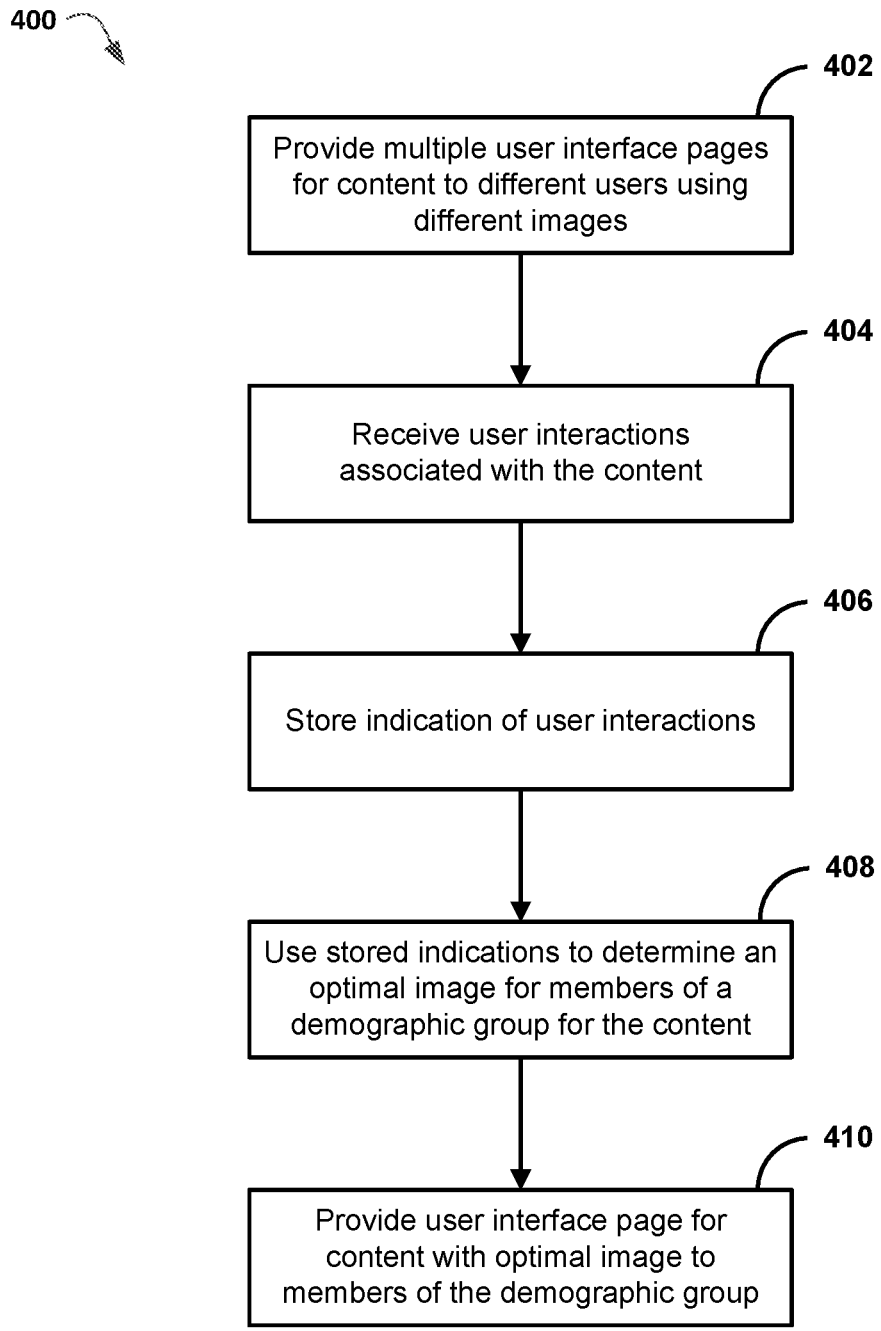
FIG. 4 is a flow diagram illustrating another example method.

In reference to FIG. 4, at step 402, multiple user interface pages may be provided for content to different users using different images. At step 404, selections of content may be received. For example, in one embodiment, a subset of a first demographic group may be provided user interface 202 with image A and another subset of the first demographic group can be provided user interface 204 with image B.

In step 406, indication of user interactions (e.g., selections) may be stored. The indication may comprise a content ID, an Image ID, and demographic information. An example set of data for a images associated with specific content (e.g., a content asset) are provided below. A real system can use significantly more demographic features and images, but for the ease of display only a few are shown in Table 1 below.

TABLE 1

| Content | Image | $10,000-$50,000 | $50,000-$100,000 | $100,000-$150,000 | Mid-Atlantic | New York | West Coast |
|---|---|---|---|---|---|---|---|
| 1234 | 1 | 1 | 1 | 0 | 2 | 0 | 0 |
| 1234 | 2 | 0 | 0 | 1 | 0 | 1 | 0 |
| 1234 | 3 | 0 | 0 | 0 | 0 | 0 | 0 |
| 1234 | 4 | 2 | 0 | 0 | 1 | 0 | 1 |
| 1234 | 5 | 0 | 1 | 3 | 1 | 2 | 1 |

In this example, "$10,000-$50,000", "$50,000-$100,000", and "$100,000-$150,000" are income brackets and "Mid-Atlantic", "New York" and "West Coast" are indications of location. These are example demographic groups (e.g., or characteristic groups). The table references multiple images (images 1-5) for a particular content (content 1234). Associated feature counts can be maintained for different demographic groups.

As members of the demographic groups select content associated with the images presented in the user interface, the selections can be added to the table. This information may be used to produce a preferred image which is provided to the other members of the Demographic groups.

As more user interactions are received, the feature counts may increase, allowing for the determining of an optimal image (e.g., or a preferred image) for different demographic groups. The optimal image may be provided to members of the demographic group. The optimal image may be sent in response to a user interface request from users in the specific demographic groups. A simple learning technique would allow for dynamically presenting the images that produces the highest click thru, and ultimately the highest view rates.

In step 408, the stored indications may be used to determine which images are preferred by members of a demographic group. In the example of Table 1, the income bracket $100,000-$150,000 show a preference for image 5. The Mid-Atlantic demographic group shows a preference for image 1.

Such tables could be used for each of the content served by a content system. In example of table 1, there are five images. The images 1-5 may be randomly provided to different members of the demographic groups during a test period.

Table 1 shows two demographic categories: income and location. Other demographic categories may be used as well. Users may be part of a demographic group in each category. For example, a user may be in the "$100,000-$150,000" demographic group and the "Mid-Atlantic" demographic group. One option is to split the demographic groups into subgroups. For example, the three (3) location groups and three (3) income groups can be split into nine (9) subgroups. Alternately, the selections for different categories can be combined when the preferred image is to be provided to a user. The combination can be weighted or unweighted.

In step 410, the user interface page for content with the optimal image may be provided to members of the demographic group. For example, optimal images may be provided for each demographic group to members of the demographic groups. For Table 1, the income bracket "$100,000-$150,000" shows a preference for image 5. The "Mid-Atlantic" demographic group shows a preference for image 1. If a user is a member of both groups then one of the categories could have preference or a combination could be used. An unweighted combination of the selections for the income bracket "$100,000-$150,000" and "Mid-Atlantic" demographic group would have image 5 as the selected image.

A/B testing can be used to determine which of the multiple images gets selected more by the members of each demographic group. A/B testing is a term for a randomized experiment such as with two variants, A and B, which are the control and variant in the controlled experiment. A/B testing is a form of statistical hypothesis testing with two variants. Other terms used for this method include bucket tests and split-run testing. The A/B testing can also include the testing of more than two variants. The A/B testing can be automatically done with candidate images as input.

Figure 5:
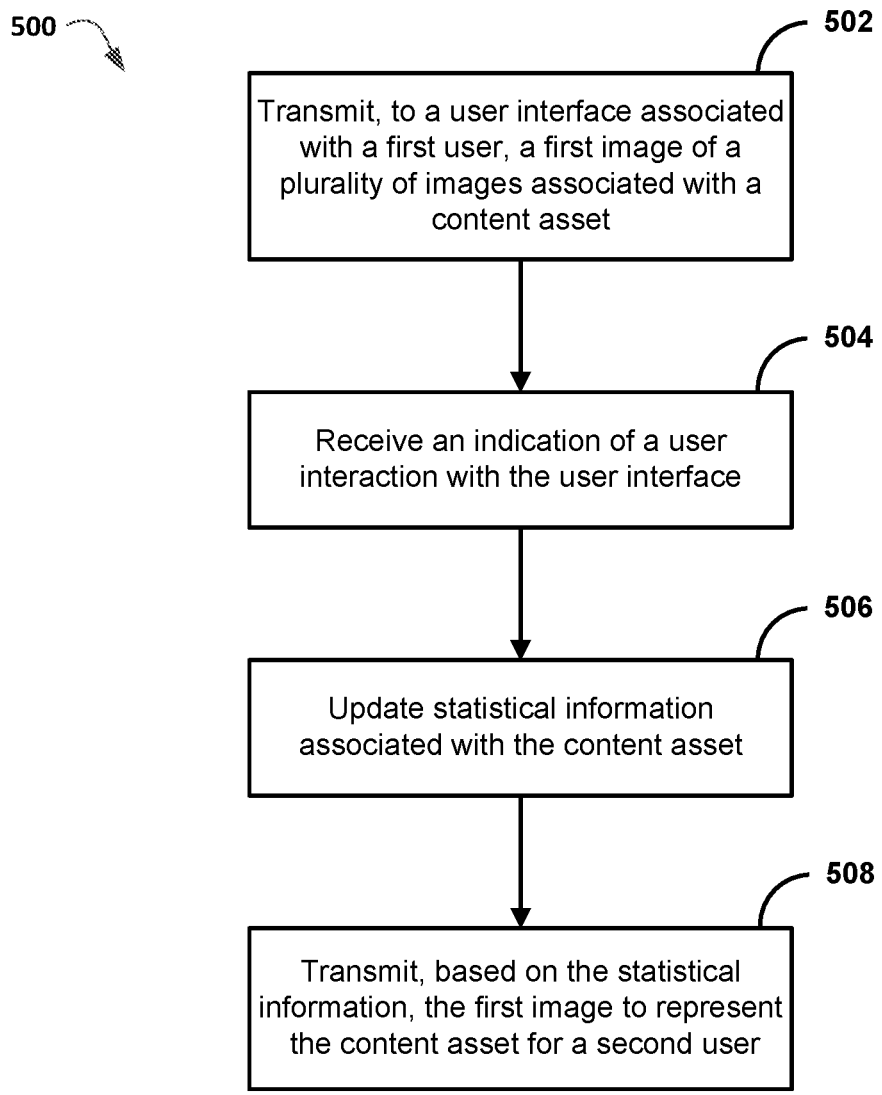
FIG. 5 is a flow diagram illustrating another example method.

In reference to FIG. 5, at step 502, a first image (e.g., or data indicating the first image) of a plurality of images associated with a content asset may be transmitted. The first image may be transmitted to a user interface associated with a first user. The first image may be transmitted by a content device, such as a content server, application server, and/or the like. The first image may be a representation of the content asset. The user interface may be configured to output the first image as a representation of the content asset. A user device may comprise the user interface. The user device may comprise a set top box, a television, a content streaming device, onboard device (e.g., vehicle media system), a mobile device, a laptop, tablet device, a computing station, a smart device (e.g., a smart phone, smart glasses, smart watch), a virtual reality device, and/or the like. The content asset may comprise a video asset (e.g., show, movie, program, sports event), an audio asset (e.g., newscast, podcast, music), an application (e.g., game, app), a document (e.g., social media text, news, information, book), and/or the like.

Transmitting, to the user interface associated with the first user, the first image may be performed in response to receiving a request for data to update a menu or a page of the user interface associated with the first user.

At step 504, an indication of a user interaction with the user interface may be received (e.g., by the content device). The user interaction may be indicative of a response of the first user to the first image. The user interaction may comprise selection of a tile in a menu of the user interface. The tile may comprise the first image. The user interaction may comprise a positive interaction, a negative interactions (e.g., navigating past, navigating away from, navigating back to a menu). The interaction may comprise hovering, clicking, selecting, and/or the like. For example, the user interaction may comprise requesting output of the content asset. The indication of the user interaction with the user interface may comprise a menu context of the user interaction. The menu context may comprise a type of menu (e.g., list of content assets, content page for a specific content asset).

At step 506, statistical information associated with the content asset may be updated (e.g., by the content device). The statistical information may be updated based on the indication of the user interaction. The statistical information may be updated based on a characteristic group associated with the first user. The characteristic group may be determined based on the user interaction. The characteristic group may be determined based on a characteristic of the first user. The characteristic group may be determined based on a characteristic of the user device that transmitted the request. The characteristic group may be determined based on a user interface context associated with initiating the request. The characteristic group may be determined based on other factors, such as timing, the content asset requested, and/or the like.

The characteristic group may comprise a demographic group. The characteristic group may comprise a group associated with a characteristic, such as a user characteristic, a device characteristic, a browsing history characteristic, a subscription characteristic, an interface context (e.g., type of interface element, category or genre associated with an interface element). The characteristic may comprise an age, an income bracket, an occupation, a location, a user affinity group (e.g., sports team, political association), a combination thereof, and/or the like. The characteristic may comprise a type of device (e.g., mobile), operating system, power level, user interface version, a combination thereof, and/or the like. The characteristic may comprise a time of day, time of the month, season, and/or the like.

Updating the statistical information may comprise updating a user interaction metric associated with the first image and associated with the characteristic group. The user interaction metric may comprise a count of a number of user interactions (e.g., specific to users of the characteristic group) associated with the first representation. For example, the user interaction metric may comprise a number of times any user associated with the characteristic group requested the content asset when the first image was used in the user interface to represent the content asset. The user interaction metric may comprise a number of times any user associated with the characteristic group selected an interface element (e.g., a menu tile) comprising the first image to navigate to a page describing the content asset. The user interaction metric may represent positive interactions, negative interactions (e.g., navigating past, navigating away from, navigating back to a menu), or may represent a combination of positive interactions and negative interactions.

The method 500 may further comprise determining to represent the content asset by the first image for the second user. The first image may be determined based on being associated with a highest statistical value of the plurality of images for the characteristic group. The first representation may be determined by combining (e.g., averaging, adding, multiplying) statistical values associated with different characteristic groups. For example, more than one characteristic group may be determined for a particular request, user, and/or the like.

At step 508, the first image may be transmitted (e.g., by the content device). The first mage may be transmitted for representing the content in the user interface for a second user. The second user is associated with the characteristic group. The first image may be transmitted to represent the content in the user interface for the second user based on the second user being associated with the characteristic group. The first image may be transmitted based on the statistical information. Transmitting the first image may be based on determining to represent the content asset by the first image for the second user.

Figure 6:
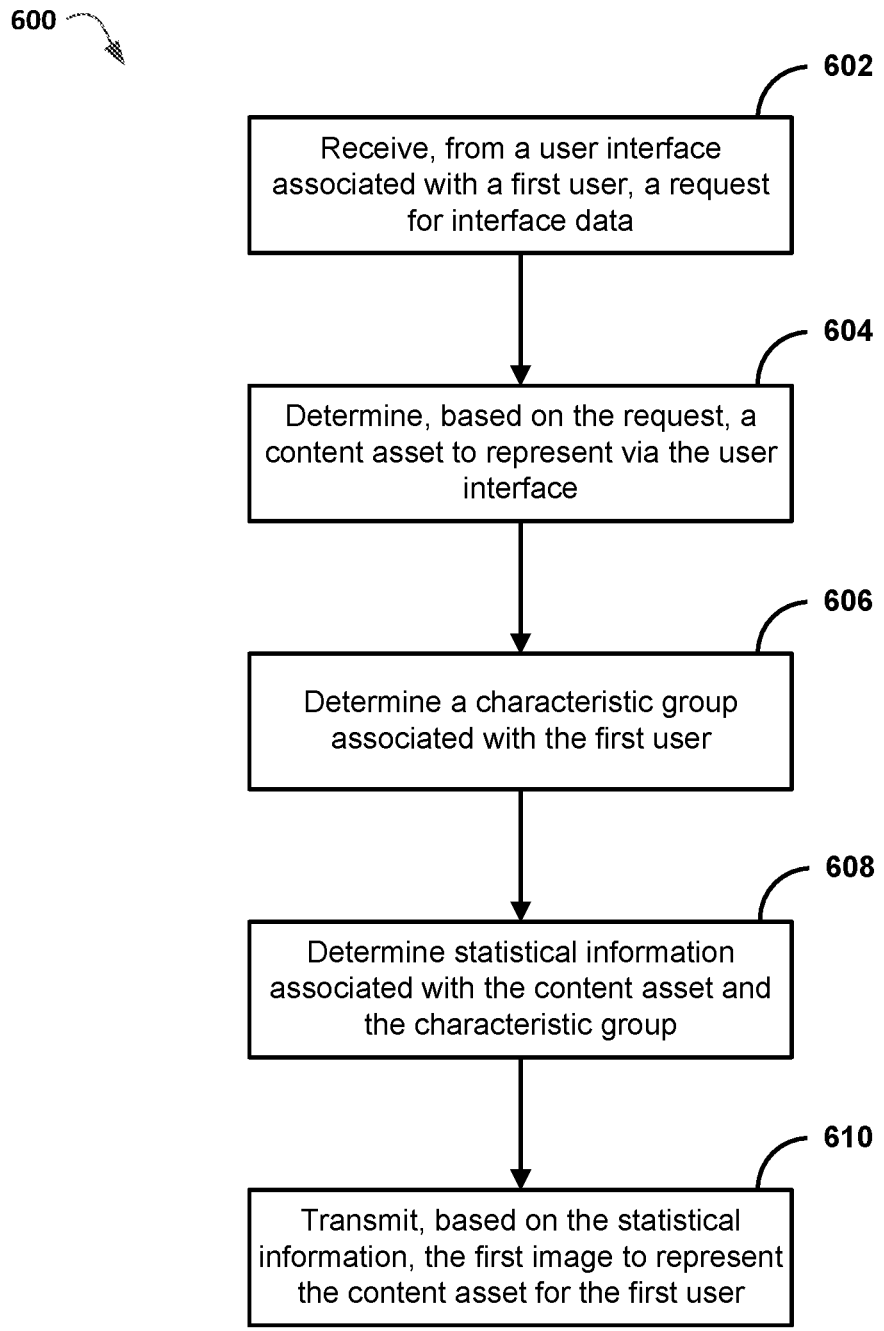
FIG. 6 is a flow diagram illustrating another example method.

In reference to FIG. 6, at step 602, a request for interface data may be received. The request may be received from a user interface associated with a first user. Receiving, from the user interface associated with the first user, a request for interface data may comprise receiving a request for the interface data to update a menu or a page of the user interface associated with the first user.

The request for interface data may be received by a content device, such as a content server, application server, and/or the like. A user device may comprise the user interface. The request may be received from the user device. The user device may comprise a set top box, a television, a content streaming device, onboard device (e.g., vehicle media system), a mobile device, a laptop, tablet device, a computing station, a smart device (e.g., a smart phone, smart glasses, smart watch), a virtual reality device, and/or the like.

At step 604, a content asset to represent (e.g., via the user interface may) be determined (e.g., by the content device). The content asset to represent may be determined based on the request. The request may comprise an identifier of the content asset. The content asset may comprise a video asset (e.g., show, movie, program, sports event), an audio asset (e.g., newscast, podcast, music), an application (e.g., game, app), a document (e.g., social media text, news, information, book), and/or the like.

At step 606, a characteristic group associated with the first user may be determined (e.g., by the content device). The characteristic group may comprise a demographic group. The characteristic group may comprise a group associated with a characteristic, such as a user characteristic, a device characteristic, a browsing history characteristic, a subscription characteristic, an interface context (e.g., type of interface element, category or genre associated with an interface element). The characteristic may comprise an age, an income bracket, an occupation, a location, a user affinity group (e.g., sports team, political association), a combination thereof, and/or the like. The characteristic may comprise a type of device (e.g., mobile), operating system, power level, user interface version, a combination thereof, and/or the like. The characteristic may comprise a time of day, time of the month, season, and/or the like.

Determining the characteristic group associated with the user may comprise determining a correspondence between user information associated with the user and a characteristic associated with the characteristic group. The characteristic group may be determined based on a characteristic of the first user. The characteristic group may be determined based on a characteristic of the user device that transmitted the request. The characteristic group may be determined based on a user interface context associated with initiating the request. The characteristic group may be determined based on other factors, such as timing, the content asset requested, and/or the like.

At step 608, statistical information associated with the content asset and the characteristic group may be determined. The statistical information may indicate responses of users associated with the characteristic group to a plurality of images used to represent the content asset. The plurality of images may comprise a first image. The statistical information may be based on prior user interactions associated with the plurality of images.

Determining the statistical information may comprise determining a user interaction metric associated with the first image and associated with the characteristic group. The user interaction metric may comprise a count of a number of user interactions (e.g., specific to users of the characteristic group) associated with the first representation. For example, the user interaction metric may comprise a number of times any user associated with the characteristic group requested the content asset when the first image was used in the user interface to represent the content asset. The user interaction metric may comprise a number of times any user associated with the characteristic group selected an interface element (e.g., a menu tile) comprising the first image to navigate to a page describing the content asset. The user interaction metric may represent positive interactions, negative interactions (e.g., navigating past, navigating away from, navigating back to a menu), or may represent a combination of positive interactions and negative interactions.

The method 600 may further comprise determining to represent the content asset by the first image for the first user. The first image may be determined based on being associated with a highest statistical value of the plurality of images for the characteristic group. The first representation may be determined by combining (e.g., averaging, adding, multiplying) statistical values associated with different characteristic groups. For example, more than one characteristic group may be determined for a particular request, user, and/or the like.

At step 610, the first image may be transmitted (e.g., by the content device, to the user device). The first image may be transmitted for representing the content asset in the user interface for the first user. The first image may be transmitted based on the statistical information. Transmitting the first image may be based on determining to represent the content asset by the first image for the first user. Determining to represent the content asset by the first image for the first user may be based on the statistical information.

Figure 7:
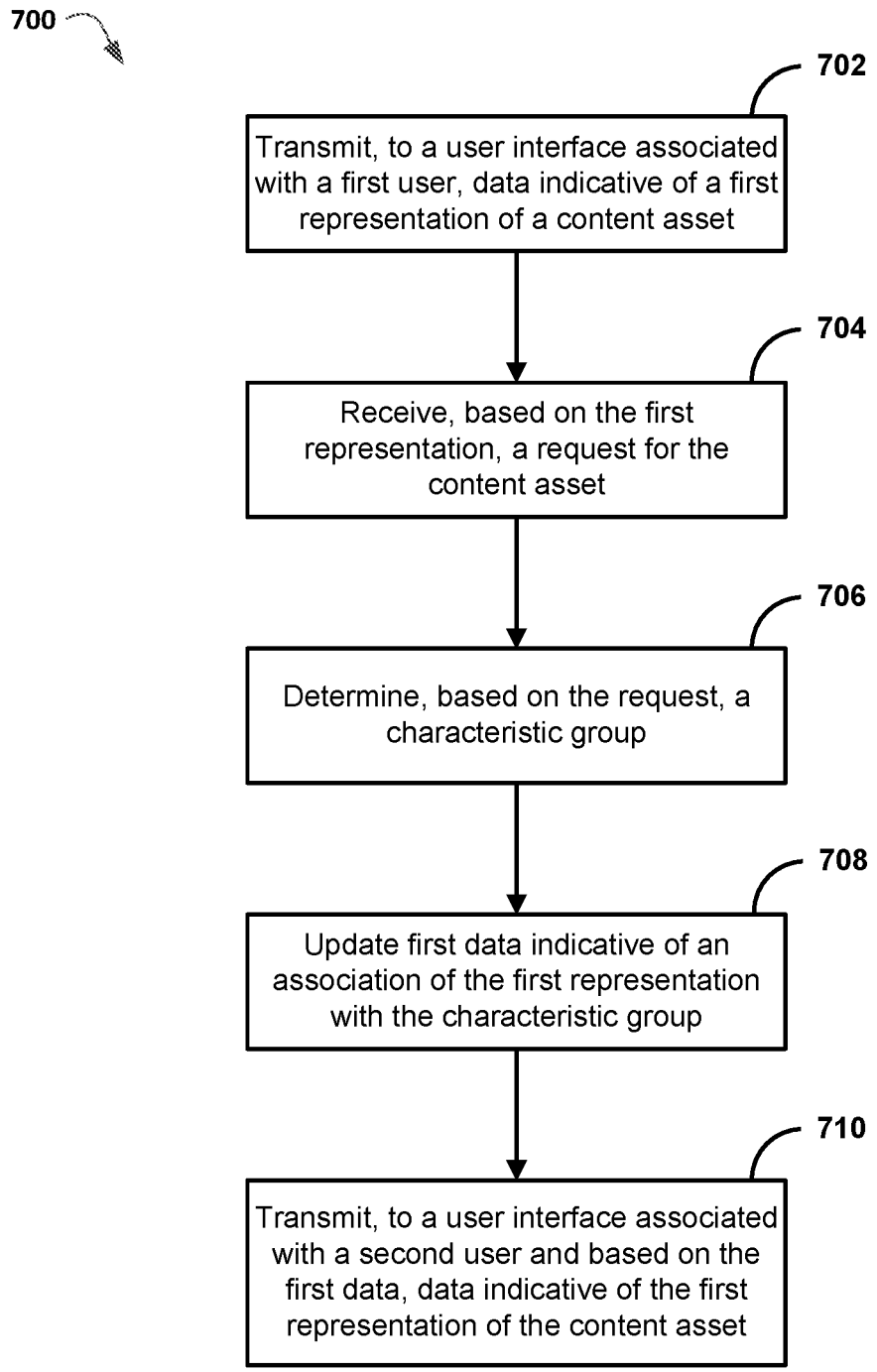
FIG. 7 is a flow diagram illustrating another example method.

In reference to FIG. 7, at step 702, data indicative of a first representation of a content asset may be transmitted. The data indicative of the first representation of the content asset may be transmitted by a content device, such as a content server, application server, and/or the like. The data indicative of the first representation of the content asset may be transmitted to a user interface associated with a first user. A user device may comprise the user interface. The user device may comprise a set top box, a television, a content streaming device, onboard device (e.g., vehicle media system), a mobile device, a laptop, tablet device, a computing station, a smart device (e.g., a smart phone, smart glasses, smart watch), a virtual reality device, and/or the like. The content asset may comprise a video asset (e.g., show, movie, program, sports event), an audio asset (e.g., newscast, podcast, music), an application (e.g., game, app), a document (e.g., social media text, news, information, book), and/or the like.

The data indicative of the first representation may comprise an image, an interface configuration (e.g., arrangement and/or location of interface elements), a uniform resource identifier (e.g., link) to retrieve the representation, a template, a color scheme, a textual description of the content asset, a video clip, and audio clip, and/or the like.

At step 704, a request for the content asset may be received (e.g., by the content device, from the user device). The request may be received based on the first representation. The request may be triggered when the first representation is presented to the user. The request for the content asset may comprise a request to access a user interface page associated with the content asset. The request for the content asset may comprise a request to output at least a portion of the content asset.

At step 706, a characteristic group may be determined (e.g., by the content device). The characteristic group may comprise a demographic group. The characteristic group may comprise a group associated with a characteristic, such as a user characteristic, a device characteristic, a browsing history characteristic, a subscription characteristic, an interface context (e.g., type of interface element, category or genre associated with an interface element). The characteristic may comprise an age, an income bracket, an occupation, a location, a user affinity group (e.g., sports team, political association), a combination thereof, and/or the like. The characteristic may comprise a type of device (e.g., mobile), operating system, power level, user interface version, a combination thereof, and/or the like. The characteristic may comprise a time of day, time of the month, season, and/or the like.

The characteristic group may be determined based on the request. The characteristic group may be determined based on a characteristic of the first user. The characteristic group may be determined based on a characteristic of the user device that transmitted the request. The characteristic group may be determined based on a user interface context associated with initiating the request. The characteristic group may be determined based on other factors, such as timing, the content asset requested, and/or the like.

At step 708, first data indicative of an association of the first representation with the characteristic group may be updated (e.g., by the content device or other associated device). The first data may comprise statistical information. The statistical information may be indicative of responses of a plurality of users to the first representation. Updating the first data may comprise updating (e.g., incrementing, adding a value to or subtracting a value from, multiplying or diving a number by) a user interaction metric associated with the first representation and associated with the characteristic group. The user interaction metric may comprise a count of a number of user interactions (e.g., specific to users of the characteristic group) associated with the first representation. For example, the user interaction metric may comprise a number of times any user associated with the characteristic group requested the content asset when the first image was used in the user interface to represent the content asset. The user interaction metric may comprise a number of times any user associated with the characteristic group selected an interface element (e.g., a menu tile) comprising the first image to navigate to a page describing the content asset. The user interaction metric may represent positive interactions, negative interactions (e.g., navigating past, navigating away from, navigating back to a menu), or may represent a combination of positive interactions and negative interactions.

The method 700 may further comprise determining to represent the content asset by the first representation for the second user. The first representation may be determined based on being associated with a highest statistical value of a plurality of representations associated with the characteristic group. The first representation may be determined by combining (e.g., averaging, adding, multiplying) statistical values associated with different characteristic groups. For example, more than one characteristic group may be determined for a particular request, user, and/or the like.

At step 710, data indicative of the first representation of the content asset may be transmitted (e.g., by the content device). The data indicative of the first representation of the content asset may be transmitted to a user interface associated with a second user. The data indicative of the first representation of the content asset may be transmitted based on the first data. Transmitting the data indicative of the first representation of the content asset may be based on the determining to represent the content asset by the first representation for the second user. Determining to represent the content asset by the first representation for the second user may be based on the first data.

Figure 8:
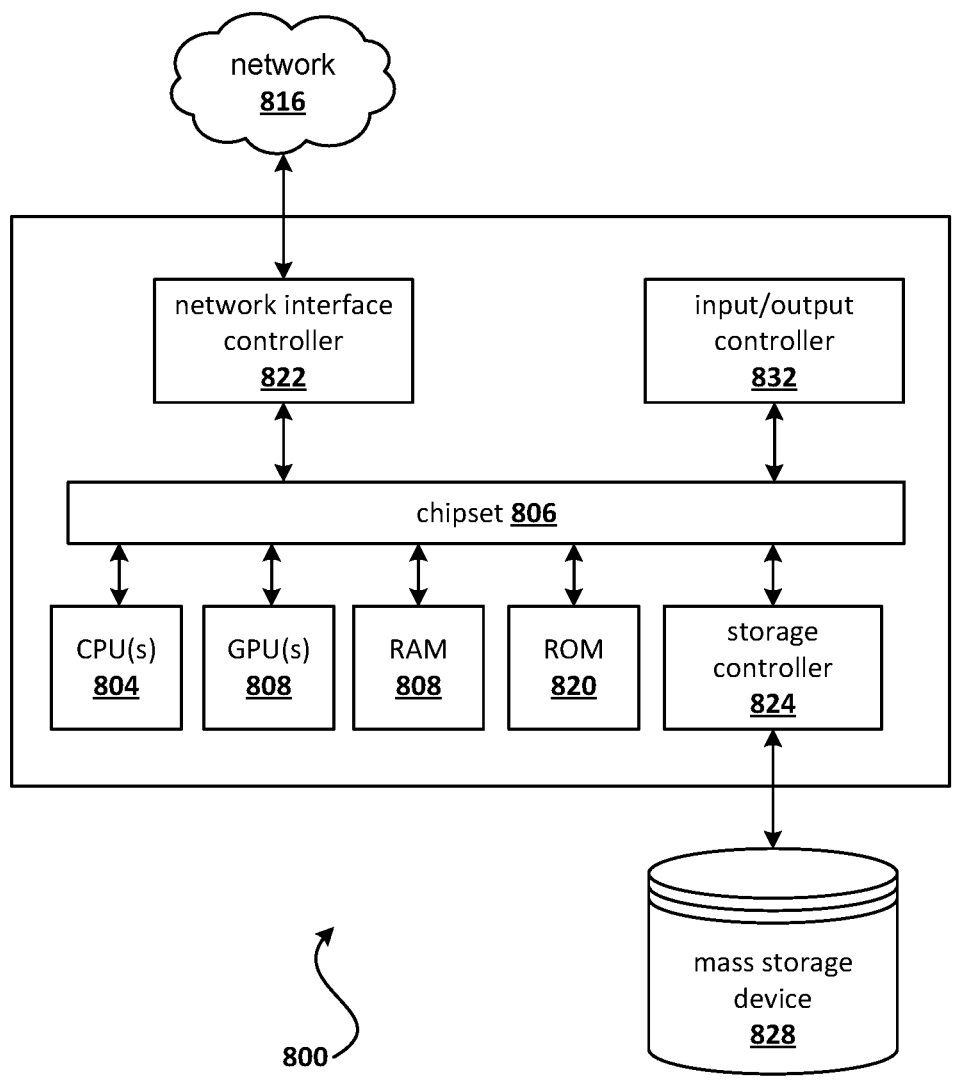
FIG. 8 is a block diagram illustrating an example computing device.

FIG. 8 depicts a computing device that may be used in various aspects, such as the servers, modules, and/or devices depicted in FIG. 1A and FIG. 1B. With regard to the example architecture of FIG. 1A-B, the interface server 102, content server 108, and Local System 120 (including modem 124 and local devices 128, 130, and 132) may each be implemented in an instance of a computing device 800 of FIG. 8. The computer architecture shown in FIG. 8 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIG. 3A, FIG. 3B, FIG. 4, FIG. 5, FIG. 6, and FIG. 7.

The computing device 800 may include a baseboard, or "motherboard," which is a printed circuit board to which a multitude of components or devices may be connected by way of a system bus or other electrical communication paths. One or more central processing units (CPUs) 804 may operate in conjunction with a chipset 806. The CPU(s) 804 may be standard programmable processors that perform arithmetic and logical operations necessary for the operation of the computing device 800.

The CPU(s) 804 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 804 may be augmented with or replaced by other processing units, such as GPU(s) 805. The GPU(s) 805 may comprise processing units specialized for but not necessarily limited to highly parallel computations, such as graphics and other visualization-related processing.

A chipset 806 may provide an interface between the CPU(s) 804 and the remainder of the components and devices on the baseboard. The chipset 806 may provide an interface to a random access memory (RAM) 808 used as the main memory in the computing device 800. The chipset 806 may further provide an interface to a computer-readable storage medium, such as a read-only memory (ROM) 820 or non-volatile RAM (NVRAM) (not shown), for storing basic routines that may help to start up the computing device 800 and to transfer information between the various components and devices. ROM 820 or NVRAM may also store other software components necessary for the operation of the computing device 800 in accordance with the aspects described herein.

The computing device 800 may operate in a networked environment using logical connections to remote computing nodes and computer systems through local area network (LAN) 816. The chipset 806 may include functionality for providing network connectivity through a network interface controller (NIC) 822, such as a gigabit Ethernet adapter. A NIC 822 may be capable of connecting the computing device 800 to other computing nodes over a network 816. It should be appreciated that multiple NICs 822 may be present in the computing device 800, connecting the computing device to other types of networks and remote computer systems.

The computing device 800 may be connected to a mass storage device 828 that provides non-volatile storage for the computer. The mass storage device 828 may store system programs, application programs, other program modules, and data, which have been described in greater detail herein. The mass storage device 828 may be connected to the computing device 800 through a storage controller 824 connected to the chipset 806. The mass storage device 828 may consist of one or more physical storage units. A storage controller 824 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 800 may store data on a mass storage device 828 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 828 is characterized as primary or secondary storage and the like.

For example, the computing device 800 may store information to the mass storage device 828 by issuing instructions through a storage controller 824 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 800 may further read information from the mass storage device 828 by detecting the physical states or characteristics of one or more particular locations within the physical storage units.

In addition to the mass storage device 828 described above, the computing device 500 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 800.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 828 depicted in FIG. 8, may store an operating system utilized to control the operation of the computing device 800. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 828 may store other system or application programs and data utilized by the computing device 800.

The mass storage device 828 or other computer-readable storage media may also be encoded with computer-executable instructions, which, when loaded into the computing device 800, transforms the computing device from a general-purpose computing system into a special-purpose computer capable of implementing the aspects described herein. These computer-executable instructions transform the computing device 800 by specifying how the CPU(s) 804 transition between states, as described above. The computing device 800 may have access to computer-readable storage media storing computer-executable instructions, which, when executed by the computing device 500, may perform the methods described in relation to FIG. 3A, FIG. 3B, FIG. 4, FIG. 5, FIG. 6, and FIG. 7.

A computing device, such as the computing device 800 depicted in FIG. 8, may also include an input/output controller 832 for receiving and processing input from a number of input devices, such as a keyboard, a mouse, a touchpad, a touch screen, an electronic stylus, or other type of input device. Similarly, an input/output controller 832 may provide output to a display, such as a computer monitor, a flat-panel display, a digital projector, a printer, a plotter, or other type of output device. It will be appreciated that the computing device 800 may not include all of the components shown in FIG. 8, may include other components that are not explicitly shown in FIG. 8, or may utilize an architecture completely different than that shown in FIG. 8.

As described herein, a computing device may be a physical computing device, such as the computing device 800 of FIG. 8. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects.

Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A method comprising:
receiving, from a user interface associated with a first user, a request for interface data;
determining, based on the request, a first content asset to represent via the user interface and a second content asset to represent via the user interface;
determining, for the first content asset and based on a first type of content associated with the first content asset, a first plurality of characteristic groups;
determining, for the second content asset and based on a second type of content associated with the second content asset, a second plurality of characteristic groups different than the first plurality of characteristic groups;
determining, for each of the first content asset and the second content asset, statistical information comprising data indicating responses of a plurality of users to a plurality of images, wherein the statistical information for the first content asset categorizes corresponding responses based on the first plurality of characteristic groups and the statistical information for the second content asset categorizes corresponding responses based on the second plurality of characteristic groups; and
causing, based on the statistical information, the user interface to output for the first user a first image, of the plurality of images, representing the first content asset and a second image, of the plurality of images, representing the second content asset.

2. The method of claim 1, wherein the first plurality of characteristic groups comprises one or more of a user affinity group or a user interest group.

3. The method of claim 1, further comprising determining, based on user information associated with the first user, one or more of the first plurality of characteristic groups that are associated with the first user, wherein the first image is caused to be output based on the first user matching the one or more of the first plurality of characteristic groups.

4. The method of claim 1, wherein receiving, from the user interface associated with the first user, the request for the interface data comprises receiving a request for the interface data to update a menu or a page of the user interface associated with the first user.

5. The method of claim 1, wherein the first type of content comprises news content and the second type of content comprises one or more of sports content or content different than news content.

6. The method of claim 1, further comprising combining, for each of one or more images, counts in the statistical information corresponding to a portion of the first plurality of characteristic groups that match the first user, wherein causing output of the first image is based on the first image having a larger number of counts than other images of the one or more images.

7. The method of claim 1, wherein the second plurality of characteristic groups comprise one or more of a device type, a user interface version, an operating system, or a user interface context.

8. A device comprising
one or more processors; and
memory storing instructions that, when executed by the one or more processors, cause the device to:
receive, from a user interface associated with a first user, a request for interface data;
determine, based on the request, a first content asset to represent via the user interface and a second content asset to represent via the user interface;
determine, for the first content asset and based on a first type of content associated with the first content asset, a first plurality of characteristic groups;
determine, for the second content asset and based on a second type of content associated with the second content asset, a second plurality of characteristic groups different than the first plurality of characteristic groups;
determine, for each of the first content asset and the second content asset, statistical information comprising data indicating responses of a plurality of users to a plurality of images, wherein the statistical information for the first content asset categorizes corresponding responses based on the first plurality of characteristic groups and the statistical information for the second content asset categorizes corresponding responses based on the second plurality of characteristic groups; and cause, based on the statistical information, the user interface to output for the first user a first image, of the plurality of images, representing the first content asset and a second image, of the plurality of images, representing the second content asset.

9. The device of claim 8, wherein the first plurality of characteristic groups comprises one or more of a user affinity group or a user interest group.

10. The device of claim 8, wherein the instructions, when executed by the one or more processors, further cause the device to determine, based on user information associated with the first user, one or more of the first plurality of characteristic groups that are associated with the first user, wherein output of the first image is caused based on the first user matching the one or more of the first plurality of characteristic groups.

11. The device of claim 8, wherein the instructions that, when executed by the one or more processors, cause the device to receive, from the user interface associated with the first user, the request for the interface data comprises instructions that, when executed by the one or more processors, cause the device to receive a request for the interface data to update a menu or a page of the user interface associated with the first user.

12. The device of claim 8, wherein the first type of content comprises news content and the second type of content comprises one or more of sports content or content different than news content.

13. The device of claim 8, wherein the instructions, when executed by the one or more processors, further cause the device to combine, for each of one or more images, counts in the statistical information corresponding to a portion of the first plurality of characteristic groups that match the first user, wherein output of the first image is caused based on the first image having a larger number of counts than other images of the one or more images.

14. The device of claim 8, wherein the second plurality of characteristic groups comprise one or more of a device type, a user interface version, an operating system, or a user interface context.

15. A non-transitory computer-readable medium storing computer-executable instructions that, when executed, cause:
   receiving, from a user interface associated with a first user, a request for interface data;
   determining, based on the request, a first content asset to represent via the user interface and a second content asset to represent via the user interface;
   determining, for the first content asset and based on a first type of content associated with the first content asset, a first plurality of characteristic groups;
   determining, for the second content asset and based on a second type of content associated with the second content asset, a second plurality of characteristic groups different than the first plurality of characteristic groups;
   determining, for each of the first content asset and the second content asset, statistical information comprising data indicating responses of a plurality of users to a plurality of images, wherein the statistical information for the first content asset categorizes corresponding responses based on the first plurality of characteristic groups and the statistical information for the second content asset categorizes corresponding responses based on the second plurality of characteristic groups; and
   causing, based on the statistical information, the user interface to output for the first user a first image, of the plurality of images, representing the first content asset and a second image, of the plurality of images, representing the second content asset.

16. The non-transitory computer-readable medium of claim 15, wherein the first plurality of characteristic groups comprises one or more of a user affinity group or a user interest group.

17. The non-transitory computer-readable medium of claim 15, wherein the instructions, when executed, further cause determining, based on user information associated with the first user, one or more of the first plurality of characteristic groups that are associated with the first user, wherein the first image is caused to be output based on the first user matching the one or more of the first plurality of characteristic groups.

18. The non-transitory computer-readable medium of claim 15, wherein receiving, from the user interface associated with the first user, the request for the interface data comprises receiving a request for the interface data to update a menu or a page of the user interface associated with the first user.

19. The non-transitory computer-readable medium of claim 15, wherein the first type of content comprises news content and the second type of content comprises one or more of sports content or content different than news content.

20. The non-transitory computer-readable medium of claim 15, wherein the instructions, when executed, further cause combining, for each of one or more images, counts in the statistical information corresponding to a portion of the first plurality of characteristic groups that match the first user, wherein causing output of the first image is based on the first image having a larger number of counts than other images of the one or more images.

21. The non-transitory computer-readable medium of claim 15, wherein the second plurality of characteristic groups comprise one or more of a device type, a user interface version, an operating system, or a user interface context.

22. A system comprising:
   a first computing device configured to store a plurality of content assets; and
   a second computing device configured to:
      receive, from a user interface associated with a first user, a request for interface data;
      determine, based on the request, a first content asset of the plurality of content assets to represent via the user interface and a second content asset of the plurality of content assets to represent via the user interface;
      determine, for the first content asset and based on a first type of content associated with the first content asset, a first plurality of characteristic groups;
      determine, for the second content asset and based on a second type of content associated with the second content asset, a second plurality of characteristic groups different than the first plurality of characteristic groups;
      determine, for each of the first content asset and the second content asset, statistical information comprising data indicating responses of a plurality of users to a plurality of images, wherein the statistical information for the first content asset categorizes corresponding responses based on the first plurality of characteristic groups and the statistical information for the second content asset categorizes corresponding responses based on the second plurality of characteristic groups; and cause, based on the statistical information, the user interface to output for the first user a first image, of the plurality of images, representing the first content asset and a second image, of the plurality of images, representing the second content asset.

23. The system of claim 22, wherein the first plurality of characteristic groups comprises one or more of a user affinity group or a user interest group.

24. The system of claim 22, wherein the second computing device is further configured to determine, based on user information associated with the first user, one or more of the first plurality of characteristic groups that are associated with the first user, wherein the first image is caused to be output based on the first user matching the one or more of the first plurality of characteristic groups.

25. The system of claim 22, wherein the second computing device is further configured to receive, from the user interface associated with the first user, the request for interface data by receiving a request for the interface data to update a menu or a page of the user interface associated with the first user.

26. The system of claim 22, wherein the first type of content comprises news content and the second type of content comprises one or more of sports content or content different than news content.

27. The system of claim 22, wherein the second computing device is further configured to combine, for each of one or more images, counts in the statistical information corresponding to a portion of the first plurality of characteristic groups that match the first user, wherein the second computing device is configured to cause output of the first image based on the first image having a larger number of counts than other images of the one or more images.

28. The system of claim 22, wherein the second plurality of characteristic groups comprise one or more of a device type, a user interface version, an operating system, or a user interface context.

* * * * *